March 5, 1963  L. T. BEMBEN  3,079,909
SOLID FUEL BURNING ARRANGEMENT
Filed Nov. 23, 1959
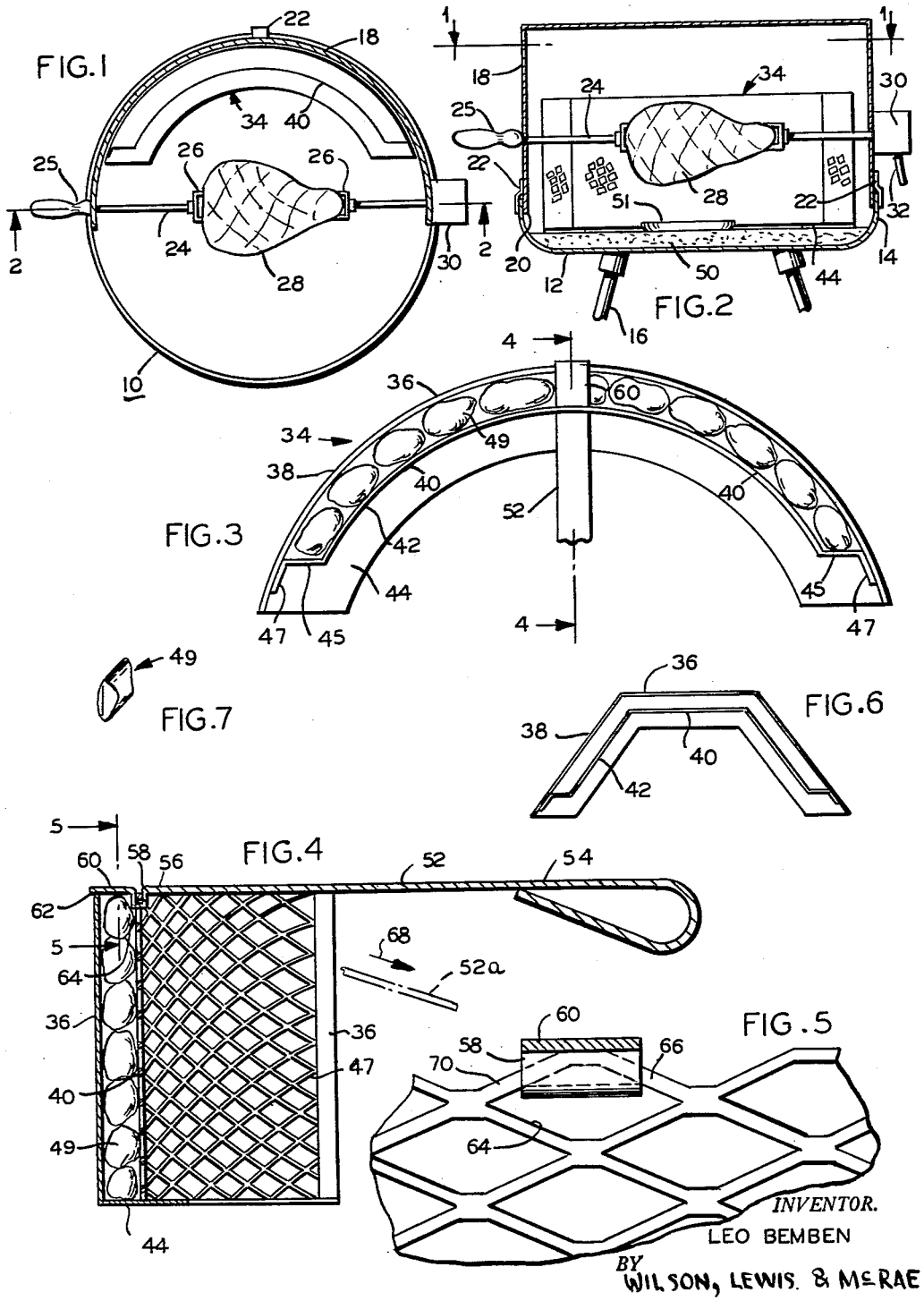
INVENTOR.
LEO BEMBEN
BY WILSON, LEWIS & McRAE
ATTORNEYS

United States Patent Office 3,079,909
Patented Mar. 5, 1963

3,079,909
SOLID FUEL BURNING ARRANGEMENT
Leo T. Bemben, 1151 Linden, Dearborn, Mich.
Filed Nov. 23, 1959, Ser. No. 854,962
2 Claims. (Cl. 126—25)

This invention relates to an arrangement for burning solid fuel, as for example charcoal in the form of homogenous briquettes or miscellaneous size chunks.

The invention has particular application in barbecuing devices wherein the food (usually meat) is carried on a rotary spit structure positioned above a horizontal fire pot, or at the base of a fireplace as found in homes or other places. In such devices a fire of burning coals is usually prepared in the pan by sprinkling a lining of sand or stones onto the bottom wall of the pan for insulation purposes, applying a layer of charcoal or briquettes onto the lining, and igniting the charcoal.

In the conventional arrangement the meat is positioned above and forwardly of the charcoal, and a drip pan is placed directly beneath the meat to collect the basting greases or juices formed during the cooking operation. The drip pan is necessarily very close to the burning coals so that the pan is heated to burn the grease, with the consequent emission of much smoke and odor.

The conventional arrangements suffer the further disadvantages of difficulty in fuel charging, inability to easily replenish the charcoal supply during the barbecuing operation, lack of draft for the burning coals, and difficulty in quenching the fuel after each barbecuing operation, and inconvenience of ash disposal operations.

With the above discussion in mind, it is an object of the present invention to provide a solid fuel burning arrangement using charcoal or the like, wherein fuel may be easily supplied to the fuel container, both prior to and during the heating operation.

A further object of the invention is to provide a fuel burning arrangement for a barbecue, wherein the fuel is contained alongside the food being barbecued as distinguished from the space beneath the food, whereby any greases or juices formed during the cooking operation are precluded from dripping onto the burning coals, the arrangement being such as to prevent splattering of grease and the emission of smoke and odor.

In connection with the immediately preceding object, it is a further object to provide a heating arrangement for barbecuing wherein the juices from the food being cooked can be easily collected and applied back onto the food for basting purposes.

An additional object of the invention is to provide a solid fuel burning arrangement for a barbecue wherein the charcoal or other fuel material is arranged as an upright single row of chunks or particles, the arrangement being such as to present a large heating area to the material being cooked without employing excessive quantities of fuel.

A further object of the invention is to provide a barbecue arrangement, including a spit structure for the food being barbecued, and a generally arcuate upright fuel basket arranged adjacent the spit structure so that burning coals within the basket partially surround the material being cooked so as to provide an even heating of the food as it is rotated around the spit axis.

Another object of the invention is to provide a fuel basket structure particularly adapted for use with circular barbecues.

An additional object is to provide a fuel basket for a circular barbecue wherein the basket is designed to occupy a minimum portion of the space within the barbecue while presenting a relatively large burning coal area to the material being cooked, the arrangement being such as to provide substantial working space in the barbecue without cutting down on the heat supply.

In connection with the above object, it is a more particular object to provide a fuel basket so arranged in a barbecue as to provide a space forwardly of the basket for the baking of potatoes, squash, etc., the arrangement being in contrast to the conventional arrangement wherein the potatoes etc. are placed directly on top of the burning coals with a resultant dampening of the fire and absorption of the heat which would otherwise travel to the meat located on the superjacent spit structure.

A further object of the invention is to provide a simplified, low-cost fuel basket construction, together with an improved detachable lifting structure therefor, the arrangement of basket and lifting structure being such that the user can readily lock the basket structure onto the lifting structure and readily carry the assembly from the barbecue when it is desired to discontinue barbecuing operations.

In connection with this last mentioned object, it is a further object of the invention to provide a lifting structure for a fuel basket wherein the lifting structure can be readily applied to or removed from the basket even when the basket is at an elevated temperature such that it cannot be readily handled manually.

Other objects of this invention will appear in the following description and appended claims, reference being had to the accompanying drawings forming a part of this specification wherein like reference characters designate corresponding parts in the several views.

In the drawings:
FIGURE 1 is a sectional view of one embodiment of the invention taken on line 1—1 in FIG. 2;
FIG. 2 is a sectional view taken on line 2—2 in FIG. 1;
FIG. 3 is an enlarged top plan view of a fuel basket employed in the FIG. 1 embodiment, with a detachable lifting structure shown in position thereon;
FIG. 4 is a sectional view on line 4—4 in FIG. 3;
FIG. 5 is an enlarged sectional view on line 5—5 in FIG. 4;
FIG. 6 is a reduced top plan view of a fuel basket which can be employed in lieu of the FIG. 3 basket; and
FIG. 7 is a perspective view of a charcoal briquette for which the FIG. 3 is especially designed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings and particularly FIGS. 1 and 2, there is shown a barbecue comprising a fire pot or pan 10 having the generally horizontal bottom wall 12 and upstanding peripheral wall 14. It will be noted that the pan is circular in plan and is provided with suitable supporting legs 16, preferably three in number and spaced at regular points about the pan bottom wall.

Removably carried on the upper portion of the pan 10 is a generally semi-circular hood structure 18 arranged so that its lower edge portion 20 fits snugly within the peripheral wall 14. A plurality of clips or arms 22 are carried on the outer surface of hood 18 to removably lock the hood onto the pan 10.

The hood is provided with a conventional removable rotary spit structure 24 having the handle 25 and the food impaling elements 26 adjustably carried thereon for gripping the food article 28 to be cooked in the barbecue. The food article shown in the drawings is a ham, but it will be appreciated that other foods such as roasts, chicken, spareribs or the like may also be cooked on the spit structure. In order to rotate the spit there is provided a conventional electric motor 30 having the electrical supply line 32 which may extend from a battery, electrical household outlet or other source of electrical energy (not shown).

In the illustrated embodiment the heating for the barbecue operation is supplied from solid fuel contained in an upstanding fuel basket 34. Basket 34 comprises an upright wall 36 having a convex outer face 38, and a foraminous upright wall 40 having a concave outer surface 42. A horizontal bottom wall 44 interconnects the lower edge portions of the two walls 36 and 40, while the upper edges of the two upright walls are left unconnected to form a top access opening for insertion of solid fuel into the basket. It will be seen from FIG. 3 that foraminous wall 40 is connected with wall 36 by means of the angularly turned wall portions 45 and the extensions 47, said extensions being suitably secured to the end area of wall 36 by welding, riveting, or other conventional means. Wall 40 is preferably formed of expanded metal, although heavy screening or other perforate wall material could be employed in its construction while still enabling it to perform its function as fuel containment structure and heat radiator.

The basket shown in FIG. 3 is particularly designed for accommodation of charcoal in the form of small briquettes 49 configured as miniature pillow-like shapes as shown in FIG. 7, although charcoal of the miscellaneous chunk size or wood can also be utilized. The briquette shown in FIG. 7 is approximately about one and one-fourth inches thick, and the spacing between walls 40 and 36 is preferably slightly greater than this thickness, as for example about one and five-eighths inches. By employing such a spacing of the walls 36 and 40 the briquette style charcoal can be loaded into the basket to form a single upright row of charcoal chunks or particles. In this manner a minimum quantity of charcoal is employed, while a relatively large coal area is presented to the cooking article 28. During the cooking operation the ash formed on the coals breaks off and drops onto collection wall 44, the forward edge of which may be turned upwardly if desired to better contain the collected ashes.

The arrangement of the basket 34 with respect to cooked article 28 is advantageous for a number of reasons, among which may be mentioned the fact that the rack partially surrounds the cooked article so as to subject the article to a substantially even heat at all points thereon. Also, since the fuel basket is positioned alongside the cooking article as distinguished from the space therebeneath, the juices from the meat do not drip onto the burning coals, and the usual emission of smoke and odor is thereby prevented from taking place. Further, with the illustrated arrangement a tray 51 can be positioned on the surface of the sand lining 50 for collecting the drippings from the meat 28 so as to facilitate basting operations.

At different periods it becomes desirable to move the fuel basket 34 about. Thus, the initial loading of the basket with fuel may under some circumstances be more conveniently effected at a point remote from the barbecue or point of eventual use, in which case some means should be provided for easily transporting the basket from place to place. Also during the cooking operation the fuel basket may be required to be positioned nearer the meat than shown in FIG. 1 in order to sear the meat surface, after which the basket may be moved back to its FIG. 1 position for deeper cooking. At the conclusion of the barbecuing operation it may be desirable to quench the burning coals by a water spray so as to preserve the charcoal for further use at a later time. Accordingly, it is desirable to provide some structure for easily transporting the basket out of the barbecue to permit the quenching operations at a suitable location away from the barbecue.

For the above-mentioned reasons it will be appreciated that mechanism for lifting and transporting the fuel basket is a desirable adjunct to the basket structure. In the illustrated embodiment there is disclosed a lifting structure 52 comprising a handle portion 54 and a basket-engaging portion 56. Portion 56 defines an upwardly opening notch or recess 58 which forms two opposed shoulders locatable against opposed faces of the wall 40 as shown in FIG. 4. Portion 60 of structure 52 is adapted to overlie the upper edge 62 of the basket wall 36, the arrangement being such that the user may grasp portion 54 and readily transport the basket to any convenient location. In order to disconnect the lifting structure from the basket the handle structure 54 is lowered with a lever-like action about the fulcrum defined by edge 62 until the lifting structure assumes the dotted line position 52a. The notch-forming structure 58 is at that time disposed within the opening 64 out of contact with the web-like walls 66 and 70; as a result the lifting structure may be withdrawn from the basket by a straight line movement in the arrow 68 direction. Insertion of the lifting structure onto the basket is accomplished by a reverse movement, i.e., an insertion of the lifting structure through opening 64, followed by an upward lever-like movement of the lifting structure about the fulcrum 62.

In the attached position of the lifting structure the opposite side areas of the notch-forming portion 58 engage the lower edges of the converging wall portion 66 and 70 at relatively widely spaced points thereon so as to form a rigid interlocking of the lifting structure on the basket, without any tendency of the basket to tip in lateral directions. Thus, although the lifting structure is formed as a single elongated element engaged only with the basket at a central point thereon, yet there is no tendency for the basket to slip from the lifting structure, even when the basket is located in a depending position from the lifting structure during transporting operations. In actual practice the user may carry the fuel basket in a depending position at his side without any danger of the basket slipping, wobbling or otherwise working loose from the lifting structure.

The drawings illustrate the lifting structure as formed from flat stock but it will be appreciated that other stock configurations as for example channel or tubular shapes may be employed.

The configuration of the fuel basket may if desired be varied from that shown in FIG. 3. For example, as shown in FIG. 6 the basket walls 36 and 40 may each be formed of interconnected flat sections while still giving the surface 42 a generally concave configuration and the outer surface 38 a generally convex configuration. The FIG. 6 basket may be utilized in FIG. 1 round barbecue if desired.

It will be appreciated that while the drawings show specific features of construction, modifications thereof may be resorted to without departing from the spirit of the invention as defined in the appended claims.

I claim:

1. A barbecue grill comprising a bottom wall, a hood supported on said bottom wall, said hood including a top wall and an upstanding side-wall structure extending upwardly from the bottom wall, said side-wall structure having an access opening therein, an upstanding fuel basket receivable through said access opening and freely resting on the bottom wall adjacent said side-wall structure remote from the access opening, said fuel basket having a bottom wall, a foraminous front wall, a back wall, and side walls interconnecting said bottom, front, and back walls, the top of said fuel basket being open for the loading of fuel into the basket interior, the positioning of the basket being such that the basket back wall is adjacent the hood side-wall structure and the basket front wall faces the hood access opening for passage of heat from burning fuel within the basket interior to food positioned in the grill between the fuel basket and the hood access opening, and an elongated lift structure for engagement with the fuel basket for removal thereof from within said hood, said elongated lift structure being configured to define a handle portion at one end thereof and a basket-engageable portion at the other end thereof; said lift structure being formed entirely separately from the basket so that the handle portion may be grasped to thrust the basket-engageable portion through the front basket wall and into contact with the back basket wall; said basket-engageable portion defining a surface which when a lifting force is applied to the handle portion develops an upwardly-acting pressure on said front basket wall, a second surface which develops a downwardly-acting pressure on said back basket wall, and a third surface which prevents a straight-line withdrawal of the lift structure from the basket.

2. The device claimed in claim 1 and further characterized in that the elongated lift structure is configured to define a handle portion at one end thereof and a notch spaced inwardly from the other end thereof; said lift structure being formed separately from the basket so that the user may manually thrust the lift structure through the front basket wall to a position wherein (1) the notch-forming surfaces lock onto the opposite faces of said front basket wall, and (2) said other end engages against the back basket wall so as to develop a downward pressure thereon when a lifting force is applied to the handle portion.

References Cited in the file of this patent

UNITED STATES PATENTS

| | | |
|---|---|---|
| 378,449 | Kendall | Feb. 28, 1888 |
| 1,018,116 | Kowalski | Feb. 20, 1912 |
| 2,885,950 | Stoll | May 12, 1959 |
| 2,886,386 | Spitzer | May 12, 1959 |
| 2,918,051 | Broman | Dec. 22, 1959 |

FOREIGN PATENTS

| | | |
|---|---|---|
| 4,061 | Germany | Feb. 24, 1879 |